US011812367B2

(12) United States Patent
Fan et al.

(10) Patent No.: US 11,812,367 B2
(45) Date of Patent: Nov. 7, 2023

(54) METHOD AND APPARATUS FOR TRANSMITTING AND RECEIVING INFORMATION IN A WIRELESS COMMUNICATION SYSTEM

(71) Applicant: Telefonaktiebolaget LM Ericsson (publ), Stockholm (SE)

(72) Inventors: Rui Fan, Beijing (CN); Pal Frenger, Linkoping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/648,810

(22) Filed: Jan. 24, 2022

(65) Prior Publication Data

US 2022/0150803 A1 May 12, 2022

Related U.S. Application Data

(63) Continuation of application No. 16/072,857, filed as application No. PCT/CN2018/079770 on Mar. 21, 2018, now Pat. No. 11,246,083.

(30) Foreign Application Priority Data

Mar. 24, 2017 (WO) ................ PCT/CN2017/078129

(51) Int. Cl.
*H04W 48/10* (2009.01)
*H04W 88/06* (2009.01)
*H04W 48/16* (2009.01)

(52) U.S. Cl.
CPC ........... *H04W 48/10* (2013.01); *H04W 48/16* (2013.01); *H04W 88/06* (2013.01)

(58) Field of Classification Search
CPC ...... H04W 48/10; H04W 48/16; H04W 88/06
See application file for complete search history.

(56) References Cited

U.S. PATENT DOCUMENTS 7,778,641 B1 8/2010 Willars et al.
11,246,083 B2 * 2/2022 Fan ........................ H04W 48/16
(Continued)

FOREIGN PATENT DOCUMENTS

CN 103703839 A 4/2014
CN 103703860 A 4/2014
(Continued)

OTHER PUBLICATIONS

1st Office Action, CN App. No. 201880001088.5, dated Jul. 13, 2020, 15 pages.
(Continued)

*Primary Examiner* — Diane D Mizrahi
(74) *Attorney, Agent, or Firm* — Nicholson De Vos Webster & Elliott LLP

(57) ABSTRACT

Methods, apparatuses and computer program products for information transmitting and receiving in a wireless communication system. A method in a network device that serves a first cell with a first RAT comprises receiving, from a network controlling device, configuration information for a second cell operating with a second RAT different from the first RAT. The method further comprises broadcasting the configuration information to a terminal device, and the configuration information is encoded according to the second RAT.

11 Claims, 5 Drawing Sheets

(56) References Cited

U.S. PATENT DOCUMENTS

| | | | |
|---|---|---|---|
| 2014/0287753 A1 | 9/2014 | Schulist et al. | |
| 2014/0334350 A1 | 11/2014 | Suzuki et al. | |
| 2015/0078334 A1 | 3/2015 | Peruru et al. | |
| 2017/0041840 A1 | 2/2017 | Claeson et al. | |
| 2017/0127333 A1 | 5/2017 | Balasubramanian et al. | |
| 2019/0141770 A1 | 5/2019 | Takahashi et al. | |
| 2019/0223214 A1* | 7/2019 | Jiang | H04W 72/0446 |

FOREIGN PATENT DOCUMENTS

| | | |
|---|---|---|
| CN | 105144787 A | 12/2015 |
| CN | 105580479 A | 5/2016 |
| WO | 2016/137532 A1 | 9/2016 |
| WO | 2016/195617 A1 | 12/2016 |

OTHER PUBLICATIONS

2nd Office Action, CN App. No. 201880001088.5, dated Mar. 2, 2021, 14 pages.

3GPP TS 36.331, "3rd Generation Partnership Project; Technical Specification Group Radio Access Network; Evolved Universal Terrestrial Radio Access (E-UTRA); Radio Resource Control (RRC); Protocol specification (Release 14)," Mar. 2017, 721 pages, V14.2.0, 3GPP Organizational Partners.

European Search Report and Search Opinion, EP App. No. 18740077.5, dated Aug. 1, 2019, 9 pages.

Exam Report, IN App. No. 201837026319, Nov. 21, 2020, 6 pages.

Grant, CN App. No. 201880001088.5, May 27, 2021, 3 pages.

International Preliminary Report on Patentability, PCT App. No. PCT/CN2018/079770, dated Apr. 2, 2019, 8 pages.

International Search Report and Written Opinion for Application No. PCT/CN2018/079770, dated Jun. 12, 2018, 10 pages.

Itri, "Control plane signalling transport for LTE-NR tight interworking", 3GPP TSG-RAN WG2 Meeting #97, Tdoc R2-1701344, Athens, Greece, Feb. 13-17, 2017, 3 pages.

Non-Final Office Action, U.S. Appl. No. 16/072,857, dated Jun. 8, 2021, 9 pages.

Notice of Allowance, U.S. Appl. No. 16/072,857, dated Oct. 1, 2021, 5 pages.

Office Action, EP App. No. 18740077.5, dated Mar. 24, 2021, 5 pages.

Zte, "Consideration on System Information Broadcast in New RAT", 3GPP TSG-RAN WG2 Meeting #93bis, R2-162629, Dubrovnik, Croatia, Apr. 11-15, 2016, 4 pages.

Summons to Attend Oral Proceedings, EP App. No. 18740077.5, Jul. 7, 2022, 6 pages.

Communication under Rule 71(3) EPC for EP App. No. 18740077.5, dated Dec. 12, 2022, 6 pages.

Hearing Notice, IN App. No. 201837026319, Apr. 20, 2023, 3 pages.

* cited by examiner

METHOD AND APPARATUS FOR TRANSMITTING AND RECEIVING INFORMATION IN A WIRELESS COMMUNICATION SYSTEM

CROSS-REFERENCE TO RELATED APPLICATIONS

This application is a continuation of U.S. application Ser. No. 16/072,857, filed Jul. 25, 2018, which is a National stage of International Application No. PCT/CN2018/079770, filed Mar. 21, 2018, which claims priority to International Application No. PCT/CN2017/078129, filed Mar. 24, 2017, which are all hereby incorporated by reference.

TECHNICAL FIELD

The non-limiting and example embodiments of the present disclosure generally relate to a technical field of wireless communication, and specifically to methods, apparatuses and computer program products for transmitting and receiving information in a wireless communication system.

BACKGROUND

This section introduces aspects that may facilitate better understanding of the disclosure. Accordingly, the statements of this section are to be read in this light and are not to be understood as admissions about what is in the prior art or what is not in the prior art.

In wireless systems, there is a requirement for supporting various services. Currently, a new fifth generation (5G) radio access technique (RAT) called New Radio (NR) is being studied in the third generation partnership project (3GPP), aiming at providing, for example, enhanced mobile broadband (eMBB) communications, massive machine type (MTC) communications, and ultra reliable and low latency communications (URLLC) using a common radio access network (RAN). The NR system may operate at high frequency and/or using very high gain beamforming with narrow beams.

How to operate the NR system is still an open problem.

SUMMARY

In order to provide configuration information, for example system information, for a cell in a wireless communication system in an efficient way, methods, apparatuses and computer program products are provided in the present disclosure. It will be appreciated that embodiments of the present disclosure are not limited to NR system information transmission/reception in a 5G system, but could be more widely applied to any wireless communication system where similar problems exist.

Various embodiments of the present disclosure mainly aim at providing methods, apparatuses and computer program products for information transmitting and receiving. Other features and advantages of embodiments of the present disclosure will be understood from the following description of various embodiments when read in conjunction with the accompanying drawings, which illustrate, by way of example, the principles of embodiments of the present disclosure.

In a first aspect of the disclosure, there is provided a method in a network device that serves a first cell with a first radio access technique (RAT). The method comprises receiving, from a network controlling device, configuration information for a second cell operating with a second RAT different from the first RAT and broadcasting the configuration information to a terminal device. The configuration information is encoded according to the second RAT.

In an embodiment, the network device may broadcast the configuration information in a system information block (SIB) of the first cell.

In another embodiment, the configuration information may include a plurality of SIBs for the second cell, and the network device may broadcast each of the plurality of SIBs for the second cell in a separate SIB of the first cell. In some embodiments, the network device may broadcast a first part of the configuration information in a first SIB of the first cell, and broadcast a second part of the configuration information in a second SIB of the first cell. The first part of the configuration information may indicate minimum system information for the terminal device to access the second cell, while the second part of the configuration information may indicate a selected part of the configuration information excluding the first part.

In a further embodiment, the second part of the configuration information may include a plurality of SIBs for the second cell. In this embodiment, the network device may broadcast each of the plurality of SIBs for the second cell in a separate container in the second SIB of the first cell, or broadcast the plurality of SIBs for the second cell in a single container in the second SIB of the first cell.

In still another embodiment, the second part of the configuration information may include a plurality of types of system information for the second cell. In this embodiment, the network device may broadcast each of the plurality of types of system information for the second cell in a separate container in the second SIB of the first cell, or broadcast the plurality of types of system information for the second cell in a single container in the second SIB of the first cell.

In some embodiments, the network device may receive the configuration information for a plurality of cells operating with the second RAT. The plurality of cells includes the second cell and at least a third cell. In an embodiment, the network device may broadcast the configuration information for the plurality of cells in a single SIB of the first cell, or broadcast the configuration information for a first group of cells of the plurality of cells in a third SIB of the first cell, and broadcast the configuration information for a second group of cells of the plurality of cells in a fourth SIB of the first cell.

In another embodiment, the network device may broadcast the configuration information for the plurality of cells in a single container in a SIB of the first cell, or broadcast the configuration information for each of the plurality of cells in a separate container in a SIB of the first cell.

In still another embodiment, the method may further comprise broadcasting further information about the configuration information to the terminal device. The further information may be encoded according to the first RAT. In some embodiments, the further information may indicate at least one of: a type of the configuration information being broadcasted, an identifier for a SIB included in the configuration information being broadcasted, an identifier of a cell associated with the configuration information being broadcasted, an identifier of a new SIB of the first cell used for carrying the configuration information, and a parameter for broadcasting the configuration information.

In some embodiments, the configuration information may include system information for the second cell.

In a second aspect of the disclosure, there is provided a method in a terminal device that is in a first cell served by a network device with a first RAT and capable of operating with a second RAT different from the first RAT. The method comprises receiving configuration information, broadcasted by the network device, for a second cell operating with the second RAT and accessing the second cell based on the received configuration information. The configuration information may be encoded according to the second RAT.

In some embodiments, the method may further comprise receiving further information about the configuration information from the network device. The further information is encoded according to the first RAT. In the embodiments, receiving the configuration information for the second cell may comprises receiving the configuration information based on the received further information.

In a third aspect of the disclosure, there is provided a network device that serves a first cell with a RAT. The network device comprises a receiving unit and a first broadcasting unit. The receiving unit is configured to receive, from a network controlling device, configuration information for a second cell operating with a second RAT different from the first RAT. The first broadcasting unit is configured to broadcast the configuration information to a terminal device. The configuration information is encoded according to the second RAT. In some embodiments, the network device may further comprise a second broadcasting unit configured to broadcast further information about the configuration information to the terminal device. The further information is encoded according to the first RAT.

In a fourth aspect of the disclosure, there is provided a terminal device that is in a first cell served by a network device with a first RAT and capable of operating with a second RAT different from the first RAT. The terminal device comprises a first receiving unit and an accessing unit. The first receiving unit is configured to receive configuration information, broadcasted by the network device, for a second cell operating with the second RAT. The configuration information is encoded according to the second RAT. The accessing unit is configured to access the second cell based on the received configuration information. In some embodiments, the terminal device may further comprise a second receiving unit configured to receive further information about the configuration information from the network device. The further information may be encoded according to the first RAT.

In a fifth aspect of the disclosure, there is provided a network device. The network device includes a processor and a memory. Said memory contains instructions executable by said processor. Said processor is configured to cause the network device to perform a method according the first aspect of the present disclosure.

In a sixth aspect of the disclosure, there is provided a terminal device. The terminal device includes a processor and a memory. Said memory contains instructions executable by said processor. Said processor is configured to cause the terminal device to perform a method according the second aspect of the present disclosure.

In a seventh aspect of the disclosure, there is provided a computer program product, comprising instructions which, when executed on one or more processors, cause the one or more processors to carry out a method according to the first aspect of the present disclosure.

In an eighth aspect of the disclosure, there is provided a computer program product, comprising instructions which, when executed on one or more processors, cause the one or more processors to carry out a method according to the second aspect of the present disclosure.

In a ninth aspect of the disclosure, there is provided a computer readable storage medium having a computer program product embodied thereon. The computer program product includes instructions which, when executed on at least one processor, cause the at least one processor to carry out a method according the first aspect of the present disclosure.

In a tenth aspect of the disclosure, there is provided a computer readable storage medium having a computer program product embodied thereon. The computer program product includes instructions which, when executed on at least one processor, cause the at least one processor to carry out a method according the second aspect of the present disclosure.

According to various aspects and embodiments as mentioned above, configuration information for a cell may be transmitted in an efficient way.

BRIEF DESCRIPTION OF THE DRAWINGS

The above and other aspects, features, and benefits of various embodiments of the present disclosure will become more fully apparent from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which.

DETAILED DESCRIPTION

Figure 1:
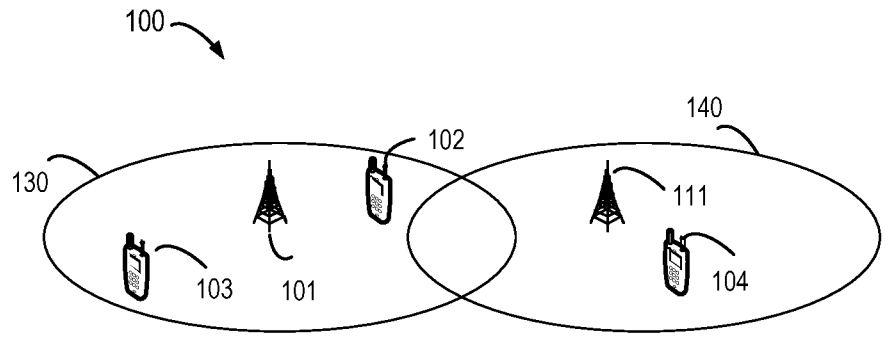
FIG. 1 illustrates an example wireless communication network in which embodiments of the present disclosure may be implemented.

Hereinafter, the principle and spirit of the present disclosure will be described with reference to illustrative embodiments. It should be understood that all these embodiments are given merely for one skilled in the art to better understand and further practice the present disclosure, but not for limiting the scope of the present disclosure. For example, features illustrated or described as part of one embodiment may be used with another embodiment to yield still a further embodiment. In the interest of clarity, not all features of an actual implementation are described in this specification.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be liming of example embodiments. As used herein, the singular forms "a," "an" and "the" are intended to include the plural forms as well, unless the context clearly indicates otherwise. It will be further understood that the terms "comprises," "comprising," "has," "having," "includes" and/or "including," when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs.

As used herein, the term "wireless communication network" refers to a network following any suitable wireless communication standards, such as NR, Long Term Evolution (LTE), LTE-Advanced (LTE-A), Wideband Code Division Multiple Access (WCDMA), High-Speed Packet Access (HSPA), and so on. Furthermore, the communications between network devices in the wireless communication network may be performed according to any suitable generation communication protocol, including, but not limited to, Global System for Mobile Communications (GSM), Universal Mobile Telecommunications System (UMTS), Long Term Evolution (LTE), and/or other suitable, and/or other suitable the first generation (1G), the second generation (2G), 2.5G, 2.75G, the third generation (3G), the fourth generation (4G), 4.5G, the fifth generation (5G) communication protocols, wireless local area network (WLAN) standards, such as the IEEE 802.11 standards; and/or any other appropriate wireless communication standard, and/or any other protocols either currently known or to be developed in the future.

As used herein, the term "network device" refers to a device in a wireless communication network via which a terminal device accesses the network and receives services therefrom. The network device may refer to a base station (BS) or an access point (AP), for example, a node B (NodeB or NB), an evolved NodeB (eNodeB or eNB), a gNB, a Remote Radio Unit (RRU), a radio header (RH), a remote radio head (RRH), a relay, a low power node such as a femto, a pico, and so forth, depending on the applied terminology and technology.

The term "terminal device" refers to any end device that may be capable of wireless communications. By way of example and not limitation, a terminal device may be referred to as user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable device, a personal digital assistant (PDA), portable computers, desktop computer, image capture terminal devices such as digital cameras, gaming terminal devices, music storage and playback appliances, wearable terminal devices, vehicle-mounted wireless terminal devices, wireless endpoints, mobile stations, laptop-embedded equipment (LEE), laptop-mounted equipment (LME), USB dongles, smart devices, wireless customer-premises equipment (CPE) and the like. In the following description, the terms "terminal device," "terminal," "user equipment" and "UE" may be used interchangeably.

The terminal device may support device-to-device (D2D) communication, for example by implementing a 3GPP standard for sidelink communication, and may in this case be referred to as a D2D communication device.

As yet another example, in an Internet of Things (IOT) scenario, a terminal device may represent a machine or other device that performs monitoring and/or measurements, and transmits the results of such monitoring and/or measurements to another terminal device and/or network equipment. The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Examples of such machines or devices are sensors, metering devices such as power meters, industrial machinery, or home or personal appliances, for example refrigerators, televisions, personal wearables such as watches etc. In other scenarios, a terminal device may represent a vehicle or other equipment that is capable of monitoring and/or reporting on its operational status or other functions associated with its operation.

As used herein, a DL transmission refers to a transmission from the network device to a terminal device, and an UL transmission refers to a transmission in an opposite direction.

FIG. 1 illustrates an example wireless communication network 100 in which embodiments of the disclosure may be implemented. As shown in FIG. 1, the wireless communication network 100 may include one or more network devices, for example network devices 101 and 111, which may be in a form of an eNB or gNB. It will be appreciated that the network device 101 or 111 could also be in a form of a Node B, Base Transceiver Station (BTS), and/or Base Station Subsystem (BSS), AP and the like. The network device 101 may provide radio connectivity to a set of terminal devices (for example UEs 102 and 103) within a cell 130 using a first RAT (for example, LTE), while the network device 111 may provide radio connectivity to another set of terminal devices for example UE 104 in another cell 140 shown in FIG. 1 using a second RAT (for example, NR). The first RAT may be different from the second RAT and the network devices 101 and 111 may be in different forms.

In addition, though network devices 101 and 111 illustrated in the example wireless communication network 100 may represent a device that includes a particular combination of hardware components, other embodiments may comprise network devices with different combinations of components. It is to be understood that a network device may comprise any suitable combination of hardware and/or software needed to perform the tasks, features, functions and methods disclosed herein.

Before introducing of the NR, in a conventional wireless communication system, each RAT only broadcasts its own system information. For example, a conventional LTE, eNB may broadcast its own system information of a cell to terminal devices within its coverage. However, inventors of the present application have realized that a NR system may operate at very high frequency and/or use very high gain beamforming with narrow beams. As a result, it may be inefficient for a corresponding NR base station (also referred to as a gNB) to broadcast system information to terminal devices directly.

Some agreement regarding system information distribution in a NR system, which was achieved during 3GPP RAN 2 meeting, is reproduced in Table 1.

TABLE 1

Agreements

1: For a cell/frequency that is considered for camping by UE, then UE should not be required to acquire minimum system information from other cell/frequency layer (this does not preclude reception via SFN that is under discussion in RAN1). This does not preclude the case that UE applies stored system information from previously visited cell(s).

Inventors of the present application have observed that the above agreement that UE may be allowed to apply/use stored system information of a NR cell, which may be obtained from a previously visited LTE cell, if the visited LTE cell transmits the NR system information. Compared with transmitting system information by the NR cell itself, it may be more resource efficient.

However, how to distribute NR system information via a conventional RAT (for example LTE) is still an open problem. Inventors of the present application have further realized that if the NR system information is to be distributed to UE from a LTE cell when the UE is in connected mode, a mechanism similar to transmitting system information of other RATs, for example GSM, WCDMA, etc. via LTE as specified in current 3GPP specification TS 36.331 V14.2.0 may be used.

However, the above mechanism can only be applied to UEs in RRC Connected mode. It is still unclear how UE in Idle/Inactive mode can receive the NR system information via LTE.

In order to solve at least part of the above problems, methods, apparatuses and computer program products have been proposed herein. Some embodiments of the present disclosure provide a solution supporting transmission of NR system information via LTE, and the solution is applicable to both UEs in Idle/Inactive mode and UEs in connected mode.

In some embodiments, new LTE SIB(s) may be defined for transmitting NR system information.

In some further embodiments, instead of being encoded by the LTE eNB using LTE abstract syntax notation one (ASN.1) explicitly, the NR system information to be broadcasted may be defined in a container provided to the LTE base station. It may avoid the need for an LTE base station to understand the ASN.1 encoding of NR.

Some embodiments of the present application may not require any software updates of the existing LTE eNB when the NR system information to be broadcasted is further extended with new functionalities in the future. Furthermore, in some embodiments, the LTE specifications may not be affected by change of the NR system information.

Figure 2:
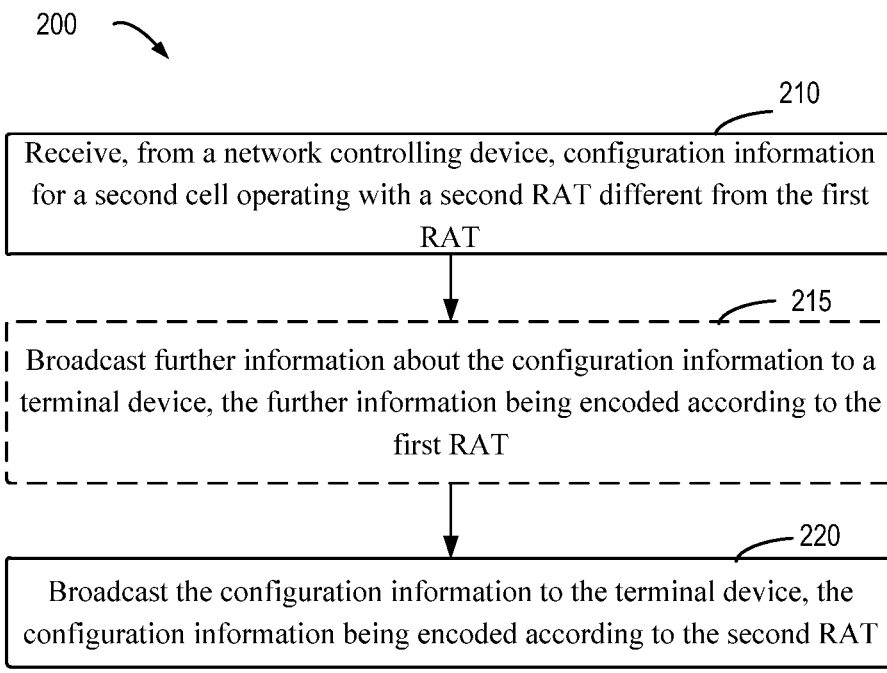
FIG. 2 illustrates flowcharts of a method implemented at a network device according to an embodiment of the present disclosure.

Reference is now made to FIG. 2 which shows a flowchart of a method 200 in a network device according to an embodiment of the present disclosure. The network device may be, for example, the network devices 101 or 111 shown in FIG. 1. For ease of discussions, the method 200 will be described below with reference to the network device 101 and the environment as described with reference to FIG. 1 by assuming that the network device 101 serves a first cell (that is, the cell 130 in FIG. 1) with a first RAT (for example, but not limited to, LTE). However, embodiments of the present disclosure are not limited thereto and may be applied more widely in other scenarios where similar problem exists.

As illustrated in FIG. 2, at block 210, the network device 101 receives, from a network controlling device, configuration information for a second cell operating with a second RAT. For example, the second cell may be the cell 140 shown in FIG. 1. In some embodiments, the second RAT may be different from the first RAT. As an example rather than limitation, the second RAT may be NR.

In some embodiments, the network controlling device from which the network device 101 receives the configuration information at block 210 may be an Operation Administration and Maintenance (OAM) node. It should be appreciated that embodiments of the present disclosure are not limited thereto. That is, the network controlling device may be in a different form in another embodiment, depending on the network architecture and technology being used. In an embodiment, the network device 101 may receive the configuration information in a container from the network controlling device.

Further, it is to be understood that the configuration information received by the network device 101 at block 210 may include, for example, system information of the second cell 140, and/or, any other information regarding the cell 140.

At block 220, the network device 101 broadcasts the configuration information to a terminal device, wherein the configuration information is encoded according to the second RAT (for example NR). By encoding the configuration information for the cell 140 according to NR, it is unnecessary for the network device 101 to read and understand the configuration information for the cell 140, and it is unnecessary to define exact content of such configuration information in the first RAT, for example LTE.

Furthermore, since the configuration information is broadcasted by the network device 101, a terminal device, even in the Inactive/Idle mode, is able to receive it.

For illustration rather than limitation, in an embodiment, in order to enable Idle/Inactive terminal devices to receive NR system information from an LTE cell/eNB, one or more new SIB types may be defined in LTE for carrying NR system information. Accordingly, in an embodiment, at block 220, the network device 101 may broadcast the configuration information to the terminal device in a SIB of the first cell 130.

In an embodiment, at block 220, the network device 101 may broadcast all the configuration information for the cell 140 in a single SIB of the first cell 130. Alternatively, in another embodiment, the configuration information for the cell 140 may be divided into two or more parts, and at block 220, the network device 101 may broadcast a first part of the configuration information in a first SIB of the cell 130, and broadcast a second part of the configuration information in a second SIB of the cell 130.

As an example, the configuration information may include a plurality of SIBs for the second cell 140, and in an embodiment, the network device 101 may broadcast each of the plurality of SIBs for the second cell 140 in a separate SIB of the first cell 130. That is to say, in this embodiment, the number of new/extra SIBs to be defined in LTE is the same as the number of SIBs included in the configuration information, which in turn may be the same as the number of SIBs defined in the NR. In an embodiment, a mapping between a new LTE SIB and a NR SIB may be predefined, for example, specified in one of the LTE standards. A benefit of this solution is that a terminal device can know clearly which SIB in LTE is used to carry which system information (SI) of NR, so the terminal device can choose to read those interested SI only, that is, only read the SI it wants to know, and avoid reading others. However, in some case where the number of SIBs included in the configuration information for the second cell 140 is large, it will require a large number of new SIBs to be defined in LTE.

Alternatively, in another embodiment, at block 220, the network device 101 may broadcast a first part of the configuration information in a first SIB of the first cell 130 and broadcast a second part of the configuration information in a second SIB of the first cell 130. In this embodiment, the number of SIBs of the cell 130 required for carrying the configuration information for the cell 140 may be reduced. As an example, the configuration information (for example, the NR system information) may be divided into minimum system information and other system information. The first part of the configuration information broadcasted by the network device 101 may indicate the minimum system information (e.g., Master Information Block (MIB), SIB1 and SIB2) or a portion thereof for the terminal device to access the second cell 140, and the second part of the configuration information may indicate all of the other system information, that is, all of the configuration information excluding the first part. This embodiment only requires defining two new SIBs in LTE. Therefore, a benefit of this solution is that less SIBs need to be defined in LTE. However, since all other system information of the NR cell 140 is transmitted by the network device 101 using a single second SIB of the first cell 130, the terminal device has to receive all of them, even if it may only need some of the other system information.

In another embodiment, the second part of the configuration information broadcasted by the network device 101 at block 220 may indicate a selected/limited part of the other system information, rather than all of the other system information. In this case, remaining configuration information may be provided by the NR cell 140. In an example, the selected/limited part of the other system information to be broadcasted may be predefined, e.g., specified in one of the LTE standards. In another example, the selected part of the other system information may be all of the configuration information excluding the first part.

The second part of the configuration information broadcasted by the network device 101 using the second SIB of the cell 130 at block 220 may include a plurality of NR SI types or a plurality of SIBs of the NR cell 140. In the following, some example implementations are provided for broadcasting the second part of the configuration information.

In one example, the second part of the configuration information may include a plurality of SIBs for the second cell 140, and at block 220, the network device 101 may broadcast each of the plurality of SIBs for the second cell 140 in a separate container in the second SIB of the first cell 130. That is, a plurality of containers may be used to convey a plurality of NR system information. In an embodiment, a mapping between the SIB for the NR cell and the container of the cell 130 may be predefined, for example in LTE RRC standard, so that the terminal device can know which container in the second SIB of the cell 130 conveys which SIB for the NR cell 140 based on the LTE specification.

Alternatively, in another embodiment, the network device 101 may broadcast the second part of the configuration information by broadcasting the plurality of SIBs for the second cell in a single container in the second SIB of the first cell 130. That is, the network device 101 may use one container to convey all NR system information. Only after decoding that container according to NR specification, the terminal device knows which part of the container is for which SIB of NR.

In another example, the second part of the configuration information may include a plurality of types of SI for the second cell 140, and at block 220, the network device 101 may broadcast each of the plurality of types of SI for the second cell 140 in a separate container in the second SIB of the first cell 130, or, broadcast the plurality of types of SI for the second cell in a single container in the second SIB of the first cell 130.

Note that in some embodiments, the configuration information for the second cell 140 may be divided into a plurality of groups in other way, but transmission solutions similar to that described above still apply.

In some embodiments, at block 210, the network device 101 may receive the configuration information for a plurality of cells operating with the second RAT (for example, NR). The plurality of cells includes the second cell 140 and at least a third cell not shown in FIG. 1. Then the network device 101 may broadcast NR system information for not only one NR cell, but a group of NR cells. In the following, some example implementations for broadcasting SI for a plurality of NR cells by the network device 101 at block 220 are provided.

In one example, the network device 101 may broadcast the configuration information for the plurality of cells in a single SIB of the first cell. This embodiment may require a small number of new SIBs of the first cell 130 for carrying the configuration for the second cell 140.

Alternatively, in another embodiment, the network device 101 may broadcast configuration information for a first group of cells of the plurality of cells in one SIB (for example, a third SIB) of the first cell, and broadcast configuration information for a second group of cells of the plurality of cells in another SIB (for example, a fourth SIB) of the first cell. That is, the configuration information for the plurality of cells may be broadcasted by using a plurality of SIBs of the cell 130. It should be appreciated that embodiments are not limited to any specific way for dividing the plurality of cells into groups. In some embodiments, each of the first group and the second group of cells may include one or more NR cells.

In still another embodiment, the network device 101 may broadcast the configuration information for the plurality of cells in a single container in a SIB of the first cell 130. That is, one container is used to convey all of the system information for a group of NR cells, and UE can only know system information for which cell is included in the container after decoding that container according to NR technique, for example according to the NR specification.

Alternatively, in another embodiment, the network device 101 may broadcast the configuration information for each of the plurality of cells in a separate container in a SIB of the first cell. That is, a plurality of containers may be used, and each container only conveys configuration information (for example, system information) for a specific cell.

In still another embodiment, the configuration information may be divided into groups with a finer granularity. For example, each container or a new SIB of the cell 130 may be used to carry a specific SIB i for a specific cell j. That is, if the configuration information includes M SIBs for each of N cells, then M×N containers or SIBs of the cell 130 may be used for broadcasting the configuration information.

In some embodiments, a mapping between a container and a combination of the specific SIB and the specific cell may be predefined.

Alternatively or in addition, in some embodiments, in order to facilitate receiving of the configuration information at the terminal device 102 side, the network device 101 may broadcast further information about the configuration information to the terminal device 102 at an optional block 215. In an embodiment, the further information may be encoded according to the first RAT (for example, LTE).

For example rather than limitation, the further information may indicate at least one of: a type of the configuration information being broadcasted, an identifier for a SIB included in the configuration information being broadcasted, an identifier of a cell associated with the configuration information being broadcasted, an identifier of a new SIB of the first cell used for carrying the configuration information, and a parameter for broadcasting the configuration information.

The further information may be decoded by the terminal device first, and then enable the terminal device to decide whether to decode a corresponding container or SIB of the cell 130 in order to save power.

For example, if system information of the cell 140 is to be broadcasted in a container or a new SIB of the cell 130 by the network device 101 at block 220, then at block 215, the network device may indicate cell ID of the cell 140 to the terminal device 102, and the cell ID of cell 140 may be encoded according to LTE standard, (for example, LTE RRC specification), so that the terminal device may get to know system information of which cell being conveyed in the container or new SIB of the cell 130, upon receiving LTE SIB of the cell 130.

As another example, if a specific SIB of one or more NR cells is to be broadcasted in a container or a new SIB of the cell 130 by the network device 101 at block 220, then at block 215, the network device may indicate SIB ID of the NR cell(s) to the terminal device and the SIB ID of the NR cell(s) may be encoded according to LTE standard, (for example, LTE RRC specification), so that the terminal device 102 may know which SIB of the NR cell(s) is conveyed in the container or new SIB of the cell 130 upon receiving LTE SIB of the cell 130.

For illustration rather than limitation, in another embodiment, the network device 101 may indicate, for example in LTE SIB 1, which new LTE SIB is used to transmit which NR system information. The network device 101 may further inform the terminal device 102 regarding how or in which resource a new defined LTE SIB is transmitted, and/or transmission periodicity of the new LTE SIB etc. Then the terminal device 102 may check LTE SIB1 to know which new SIB to detect and/or where to detect the new SIB for receiving the configuration for NR.

Note that, such further information may be omitted in another embodiment where the terminal device may derive the ID of the NR SIB carried in a container or new LTE SIB based on predefinition.

It is to be understood that embodiments are not limited to broadcasting the configuration information of the second cell 140 via any specific signaling, however, for illustration purpose, one example of broadcasting the configuration information via LTE SIB is provided below in Table 2. With this example, even an Idle/Inactive terminal device can receive the NR system information by detecting new LTE SIB from the network device 101.

TABLE 2

Example of new SIB for carrying NR SI

SystemInformationBlockType2x ::=    SEQUENCE {
   NRMinimumSystemInformationList
   NRMinimumSystemInforamtionList
}
SystemInformationBlockType2y ::=    SEQUENCE {
   NROtherSystemInformationList
   NROtherSystemInforamtionList
}
NRMinimumSystemInforamtionList ::= SEQUENCE (SIZE
(1..maxNRSI-Message)) OF NRMinimumSystemInformation
NRMinimumSystemInformation ::= SEQUENCE {
   NRCellId              INTEGRER (0..1024)
   MinimumSystemInformationContainer OCTET STRING
}
NROtherSystemInforamtionList ::= SEQUENCE (SIZE
(1..maxNRSI-Message)) OF NROtherSystemInformation
NROtherSystemInformation ::= SEQUENCE {
   NRCellId              INTEGRER (0..1024)
   OtherSystemInformationContainer OCTET STRING
}

In the example shown in Table 2, new SIBs including "SystemInformationBlockType2x" and "SystemInformationBlockType2y" are used to carry minimum system information (e.g., MIB and SIB1) and other system information (e.g., SIB2, SIB3, and other SIBs) of a NR cell, respectively. It should be appreciated that Table 2 is just presented for schematically illustrating a structure for carrying NR SI, and embodiments of the present disclosure are not limited to exact content included in the minimum system information and other system information, i.e., "SystemInformationBlockType2x" and "SystemInformationBlockType2y." Further, in the example shown in Table 2, cell ID of the NR cell is indicated via an information field "NRCellId", which is encoded according to LTE specification and takes a value from 0 to 1024. The exact system information "MinimumSystemInformationContainer" and "OtherSystemInformationContainer" of the NR cell may present in the new LTE SIB as an octet string which is unreadable or transparent to the LTE network device 101.

Some examples for carrying system information of NR cells using the new LTE SIB 2x and SIB 2y (which may be for example SystemInformationBlockType2x and SystemInformationBlockType2y shown in table 2 respectively) are illustrated schematically in FIGS. 3A-3D.

Figure 3A:
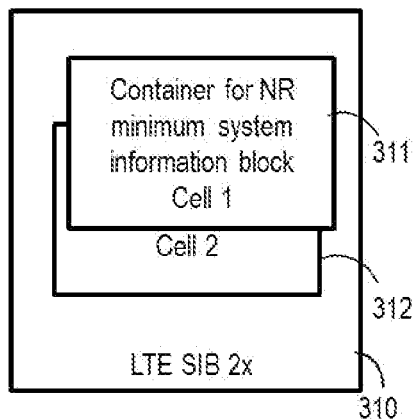
FIGS. 3A-3D illustrate examples for carrying configuration information for a second cell by using SIB of a first cell.
Figure 3B:
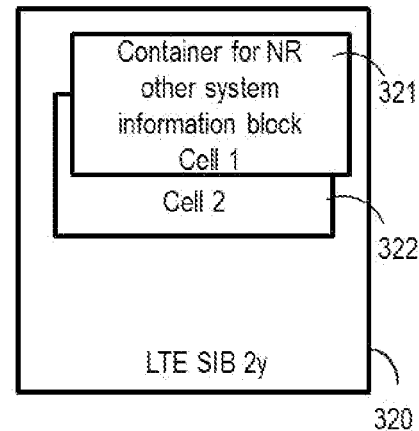

In the example shown in FIG. 3A, the network device 101 may broadcast minimum NR system information block (e.g., MIB, SIB1, SIB2, or a portion thereof) for cell 1 and cell 2 in the LTE new SIB 2x 310, and wherein the minimum system information block for cell 1 is included in a container 311 and the minimum system information block for cell 2 is included in a container 312. Alternatively or in addition, in the example shown in FIG. 3B, the network device 101 may broadcast other NR system information block (e.g., SIB2, SIB3, and/or other SIBs) for cell 1 and cell 2 in the LTE new SIB 2y 320, and wherein the other system information block for cell 1 is included in a container 321 and the other system information block for cell 2 is included in a container 322.

Figure 3C:
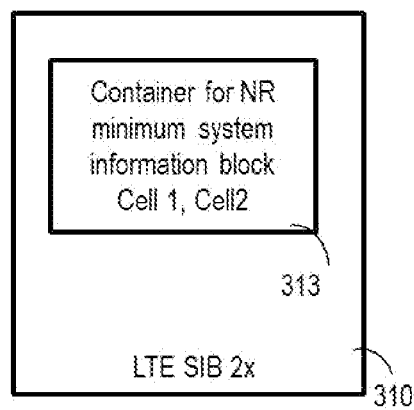
Figure 3D:
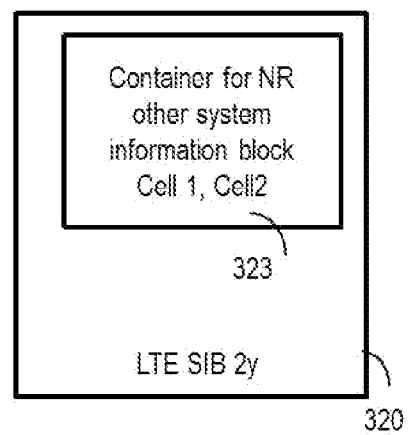

In the example shown in FIG. 3C, the network device 101 may broadcast NR minimum system information block for both cell 1 and cell 2 in the LTE new SIB 2x 310, using a single container 313. Alternatively or in addition, in the example shown in FIG. 3D, the network device 101 may broadcast other NR system information block for both cell 1 and cell 2 in the LTE new SIB 2y 320, using a single container 323.

In an embodiment of the present application, the terminal device 102 may obtain NR system information from the LTE cell 130 and then access NR cell 140 immediately once it detects the NR cell, without receiving the system information from the NR cell 140 directly. An example procedure for obtaining NR system information from an LTE cell by the terminal device 102 is shown in FIG. 4.

In this example, the LTE eNB 101 receives (410) NR system information for another cell (for example, the cell 140 in FIG. 1 served by gNB 111) from a network node 401 which may be, for example but not limited to, an OAM node. In an embodiment, the NR system information may be received by the network device 101 in a container. The network device 101 transmits (420) a synchronization signal to terminal device 102 within its coverage. After achieving downlink synchronization with the network device 101, the terminal device 102 can receive (430) SIBs from the network device 101. In this example, one or more of the SIBs from the network device 101 carry NR system information for the cell 140 in FIG. 1. In an embodiment, the terminal device 102 may receive the NR system information in a container in one or more of the LTE SIBs. The terminal device 102 may detect (440) the synchronization signal from the NR cell, for example from the gNB 111 in FIG. 1, when it moves close to the gNB 111. Since system information of the NR cell has already been received by the terminal device 102 in advance, the terminal device 102 may access the NR cell after synchronization with the NR cell without receiving system information from the gNB 111.

Figure 4:
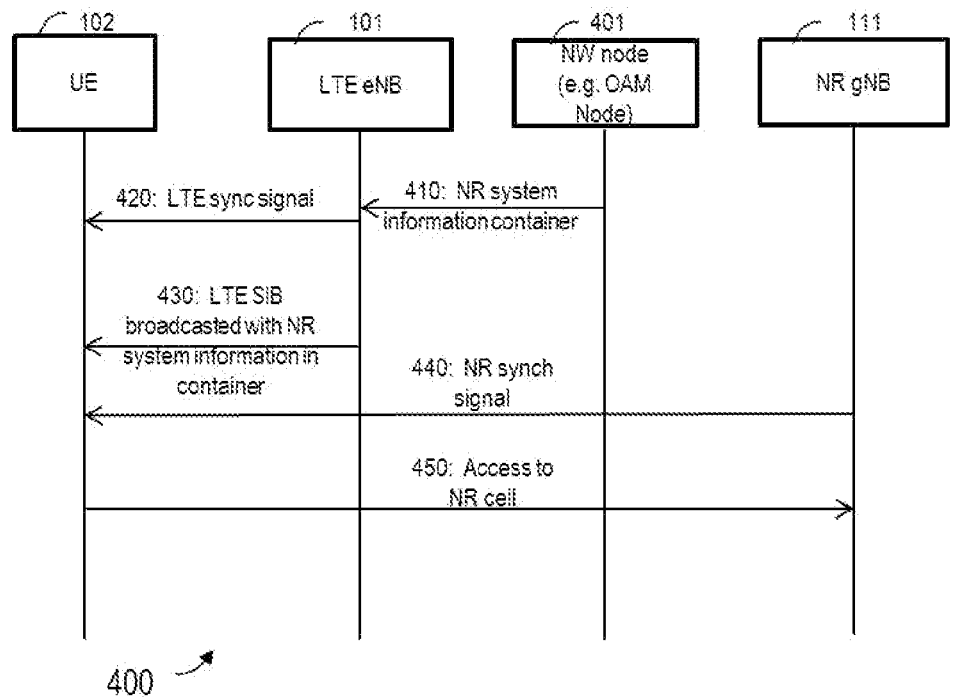
FIG. 4 illustrates an example procedure for acquiring configuration information for a second cell from a base station of a first cell.

It should be appreciated that FIG. 4 just illustrates an access procedure of the terminal device 102 in a simplified way. That is to say, other operations not shown in FIG. 4 may also be involved in the access procedure. In an embodiment, the LTE eNB 101 may broadcast only a portion of the system information required for the terminal device 102 to access the NR cell, and in this case, the terminal device 102 may receive (not shown in FIG. 4) remaining system information required for the access from the gNB 111 after synchronization with the NR cell, and then access (450) the NR cell based on the system information received from the LTE eNB 101 and the system information received from the gNB 111.

As an example, the NR cell may transmit a very small and non-complete "SIB1" to a terminal device for some reason, for example for automatically detecting cell neighbors and establishing neighbor relations via Automating Neighbor Relations (ANR). The "non-complete SIB1", together with the system information received from the LTE eNB 101, may be used by the terminal device 102 for accessing the NR cell. For illustration rather than limitation, the "non-complete SIB1" may contain, for example, "PLMN area ID" or "system information area ID," but "UL and DL configurations (including PRACH, PDCCH, etc.)" may not be included. In this case the terminal device 102 may need to verify the information contained in the "non-complete SIB 1" transmitted from the NR cell before accessing the cell.

Figure 5A:
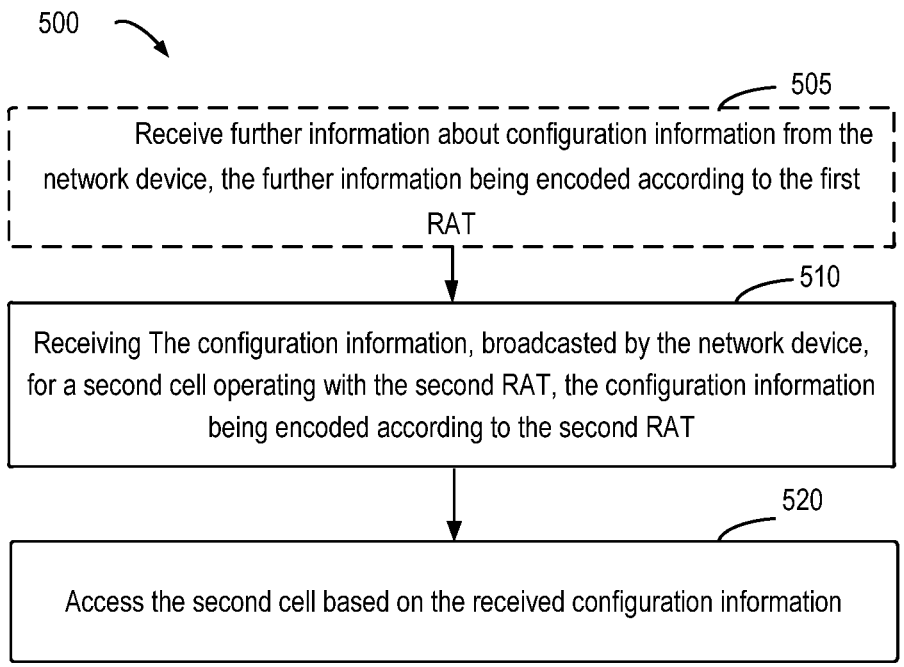
FIGS. 5A-5B illustrate flowcharts of a method implemented at a terminal device according to an embodiment of the present disclosure.

Reference is now made to FIG. 5A which shows a flowchart of a method 500 in a terminal device according to an embodiment of the present disclosure. The terminal device may be, for example, any of the terminal devices 102-104 shown in FIG. 1. For ease of discussions, the method 500 will be described below with reference to the terminal device 102 and the environment as described with reference to FIG. 1 by assuming that the terminal device 102 is in a first cell (that is, the cell 130 in FIG. 1) served by the network device 101 with a first RAT (for example but not limited to LTE), and the terminal device is also capable of operating with a second different RAT (for example but not limited to NR). However, embodiments of the present disclosure are not limited thereto and may be applied more widely in other scenarios where similar problem exists.

As illustrated in FIG. 5A, at block 510, the terminal device 102 receives configuration information broadcasted by the network device 101, for a second cell 140 operating with the second RAT, and the configuration information is encoded according to the second RAT. At block 520, the terminal device 102 accesses the second cell based on the received configuration information.

In an embodiment, the configuration information received by the terminal device 102 at block 510 may be the same as that broadcasted by the network device 101 at block 220 using any embodiment of method 200 shown in FIG. 2. Therefore, relevant description with respect to the configuration information provided with reference to method 200 and FIGS. 2-4 also applies here and details will not be repeated.

For example, in an embodiment, at block 510, the terminal device 102 may receive the configuration information in a SIB of the first cell 130. The SIB of the first cell 130 may be a new SIB defined in LTE for carrying the configuration for the NR cell 140.

In another embodiment, the configuration information may include a plurality of SIBs for the second cell, and at block 510, the terminal device 102 may receive each of the plurality of SIBs for the second cell in a separate SIB of the first cell 130.

Figure 5B:
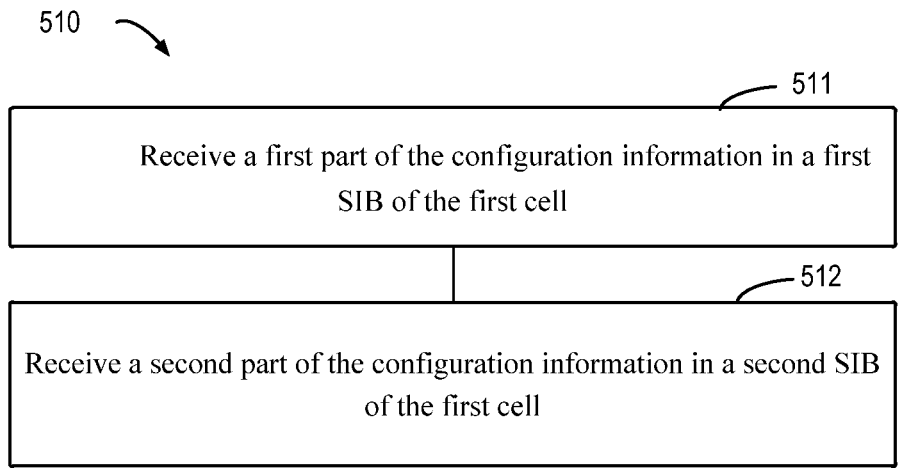

Alternatively, as shown in FIG. 5B which illustrates an example implementation of block 510, the terminal device 102 may receive a first part of the configuration information in a first SIB of the first cell 130 at block 511; and receive a second part of the configuration information in a second SIB of the first cell 130 at block 512. The first part of the configuration information may indicate minimum system information for the terminal device to access the second cell, and the second part of the configuration information may indicate all or a selected part of the configuration information excluding the first part.

In an embodiment, the second part of the configuration information may include a plurality of SIBs for the second cell, and at block 510, the terminal device 102 may receive each of the plurality of SIBs for the second cell in a separate container in the second SIB of the first cell and receive the plurality of SIBs for the second cell in a single container in the second SIB of the first cell.

In another embodiment, the second part of the configuration information may include a plurality of types of system information for the second cell, and at block 510, the terminal device 102 may receive each of the plurality of types of system information for the second cell in a separate container in the second SIB of the first cell or receive the plurality of types of system information for the second cell in a single container in the second SIB of the first cell.

In still another embodiment, at block 510, the terminal device 102 may receive the configuration information for a plurality of cells operating with the second RAT. The plurality of cells includes the second cell 140 and at least a third cell now shown in FIG. 1.

In a further embodiment, at block 510, the terminal device 102 may receive the configuration information for the plurality of cells in a single SIB of the first cell 130, or receive the configuration information for a first group of cells of the plurality of cells in one SIB (for example, SIB 2x) of the first cell 130, and receiving a second group of cells of the plurality of cells in another SIB (for example, SIB 2y) of the first cell 130.

Alternatively or in addition, in an embodiment, at block 510, the terminal device 102 may receive the configuration information for the plurality of cells in a single container (for example, the container 313 in FIG. 3) in a SIB of the first cell 130, or receive the configuration information for each of the plurality of cells in a separate container (for example, container 311, 312, 321, 322 in FIG. 3) in a SIB of the first cell 130.

In some embodiments, the terminal device 102 may optionally receive, at block 505, further information about the configuration information from the network device 101. In some embodiments, the further information may be encoded according to the first RAT. In these embodiments, at block 510, the terminal device 102 may receive the configuration information based on the received further information.

The further information may indicate at least one of: a type of the configuration information being broadcasted, an identifier for a SIB included in the configuration information being broadcasted, an identifier of a cell associated with the configuration information being broadcasted, an identifier of a new SIB of the first cell used for carrying the configuration information, and a parameter for broadcasting the configuration information. Descriptions related to the further information provided with reference to method 200 also apply here and details will not be repeated.

Figure 6:
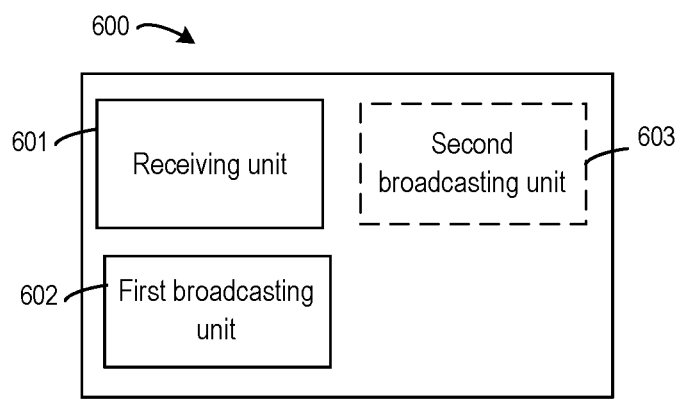
FIG. 6 illustrates a schematic block diagram of an apparatus implemented as/in a network device according to an embodiment of the present disclosure.

FIG. 6 illustrates a schematic block diagram of an apparatus 600 in a wireless communication network (for example, the wireless communication network 100 shown in FIG. 1). The apparatus may be implemented as/in a network device (for example, the network device 101 or 111) shown in FIG. 1. The network device serves a first cell (for example, cell 130 in FIG. 1) with a first RAT (for example but not limited to LTE). The apparatus 600 is operable to carry out the example method 200 described with reference to FIGS. 2-4 and possibly any other processes or methods. It is also to be understood that the method 200 is not necessarily carried out by the apparatus 600. Some operations of the method 200 can be performed by one or more other entities.

As illustrated in FIG. 6, the apparatus 600 includes a receiving unit 601 and a first broadcasting unit 602. The receiving unit 601 is configured to receive, from a network controlling device, configuration information for a second cell operating with a second RAT different from the first RAT, and the first broadcasting unit is configured to broadcast the configuration information to a terminal device, wherein the configuration information is encoded according to the second RAT.

In an embodiment, the apparatus 600 may further include a second broadcasting unit 603, configured to broadcast further information about the configuration information to the terminal device. In some embodiments, the further information may be encoded according to the first RAT.

In some embodiments, the receiving unit 601, the first broadcasting unit 602, and the second broadcasting unit 603 may be configured to perform the operations of blocks 210, 220 and 215 of FIG. 2 respectively, and therefore relevant descriptions provided with reference to method 200 and FIGS. 2-4 also apply here and details will not be repeated.

Note that the apparatus 600 in FIG. 6 or the Network device 101 or 111 in FIG. 1 may comprise processing circuitry, device readable medium, interface, user interface equipment, auxiliary equipment, power source, power delivery circuitry, and antenna. These components may be depicted as single boxes located within a single larger box, and in some cases contain additional boxes therein. In practice however, a network device may comprise multiple different physical components that make up a single illustrated component (for example, interface comprises ports/terminals for coupling wires for a wired connection and radio front end circuitry for a wireless connection). As another example, network device may be a virtual network node. Similarly, the network node may be composed of multiple physically separate components (for example, a NodeB component and a RNC component, a BTS component and a BSC component, etc.), which may each have their own respective components. In certain scenarios in which the network device comprises multiple separate components (for example, BTS and BSC components), one or more of the separate components may be shared among several network nodes. For example, a single RNC may control multiple NodeB's. In such a scenario, each unique NodeB and RNC pair, at least in some instances, may be considered a single separate network node. In some embodiments, the network node may be configured to support multiple radio access technologies (RATs). In such embodiments, some components may be duplicated (for example, separate device readable medium for the different RATs) and some components may be reused (for example, the same antenna may be shared by the RATs).

Figure 7:
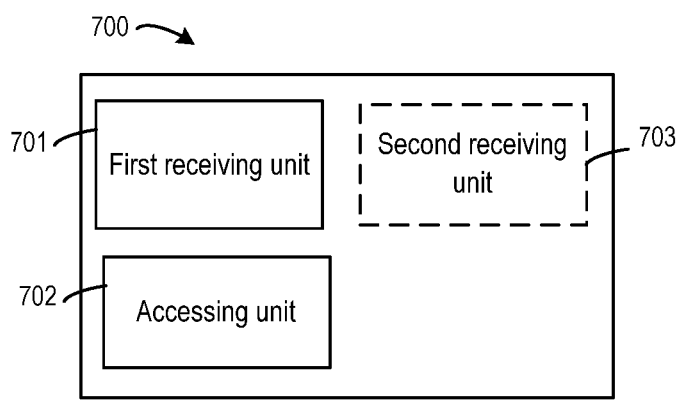
FIG. 7 illustrates a schematic block diagram of an apparatus 1000 implemented as/in a terminal device according to an embodiment of the present disclosure.

FIG. 7 illustrates a schematic block diagram of an apparatus 700 in a wireless communication network (for example, the wireless communication network 100 shown in FIG. 1). The apparatus may be implemented as/in a terminal device (for example, any of the terminal devices 102-104) shown in FIG. 1. The terminal device is in a first cell (for example, cell 130 shown in FIG. 1) served by a network device (for example, the network device 101 in FIG. 1) with a first RAT (for example but not limited to LTE), and capable of operating with a second RAT (for example, NR) different from the first RAT. The apparatus 700 is operable to carry out the example method 500 described with reference to FIGS. 5A-5B and possibly any other processes or methods. It is also to be understood that the method 500 is not necessarily carried out by the apparatus 700. Some operations of the method 500 can be performed by one or more other entities.

As illustrated in FIG. 7, the apparatus 700 includes a first receiving unit 701, and an accessing unit 702. The first receiving unit 701 is configured to receive configuration information broadcasted by the network device 101 for a second cell operating with the second RAT, wherein the configuration information is encoded according to the second RAT. The accessing unit 702 is configured to access the second cell based on the received configuration information.

In an embodiment, the apparatus 700 may further include a second receiving unit 703, configured to receive further information about the configuration information from the network device. In some embodiments the further information may be encoded according to the first RAT. In an embodiment, the first receiving unit 701 may be configured to receive the configuration information based on the received further information.

In some embodiments, the first receiving unit 701, the accessing unit 702 and the second receiving unit 703 may be configured to perform the operations of blocks 510, 520 and 505 of FIGS. 5A-5B respectively, and therefore relevant descriptions provided with reference to method 500 and FIGS. 5A-5B also apply here and details will not be repeated.

Figure 8:
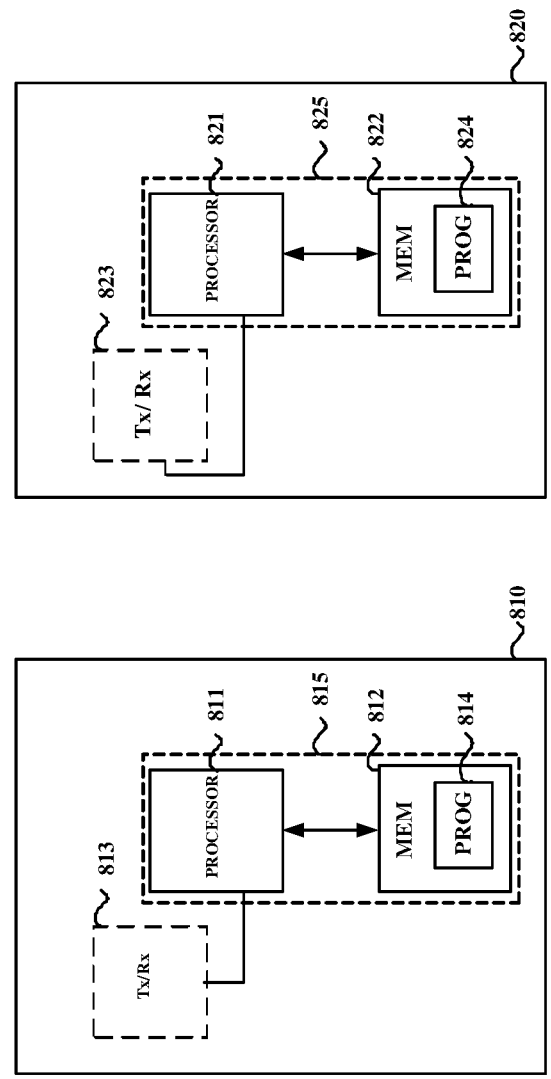
FIG. 8 illustrates a simplified block diagram of an apparatus that may be embodied as/in a network device, and an apparatus that may be embodied as/in a terminal device.

FIG. 8 illustrates a simplified block diagram of an apparatus 810 that may be embodied in/as a network device, for example, the network device 101 or 111 shown in FIG. 1, and an apparatus 820 that may be embodied in/as a terminal device, for example, any of the terminal devices 102-104 shown in FIG. 1.

The apparatus 810 may include one or more processors 811, such as a data processor (DP) and one or more memories (MEM) 812 coupled to the processor 811. The apparatus 810 may further include a transmitter TX and receiver RX 813 coupled to the processor 811. The MEM 812 may be non-transitory machine readable storage medium and it may store a program or a computer program product (PROG) 814. The PROG 814 may include instructions that, when executed on the associated processor 811, enable the apparatus 810 to operate in accordance with the embodiments of the present disclosure, for example to perform the method 200. A combination of the one or more processors 811 and the one or more MEMs 812 may form processing means 815 adapted to implement various embodiments of the present disclosure.

The apparatus 820 includes one or more processors 821, such as a DP, and one or more MEMs 822 coupled to the processor 821. The apparatus 820 may further include a suitable TX/RX 823 coupled to the processor 821. The MEM 822 may be non-transitory machine readable storage medium and it may store a PROG 824. The PROG 824 may include instructions that, when executed on the associated processor 821, enable the apparatus 820 to operate in accordance with the embodiments of the present disclosure, for example to perform the method 500. A combination of the one or more processors 821 and the one or more MEMs 822 may form processing means 825 adapted to implement various embodiments of the present disclosure.

Various embodiments of the present disclosure may be implemented by computer program or computer program product executable by one or more of the processors 811 and 821, software, firmware, hardware or in a combination thereof.

The MEMs 812 and 822 may be of any type suitable to the local technical environment and may be implemented using any suitable data storage technology, such as semiconductor based memory terminal devices, magnetic memory terminal devices and systems, optical memory terminal devices and systems, fixed memory and removable memory, as non-limiting examples.

The processors 811 and 821 may be of any type suitable to the local technical environment, and may include one or more of general purpose computers, special purpose computers, microprocessors, digital signal processors DSPs and processors based on multicore processor architecture, as non-limiting examples.

Although some of the above description is made in the context of a wireless communication system shown in FIG. 1, it should not be construed as limiting the spirit and scope of the present disclosure. The principle and concept of the present disclosure may be more generally applicable to other scenarios.

In addition, the present disclosure may also provide computer readable storage medium such as a memory containing the computer program or computer program product as mentioned above, which includes machine-readable media and machine-readable transmission media. The machine-readable media may also be called computer-readable media, and may include machine-readable storage media, for example, magnetic disks, magnetic tape, optical disks, phase change memory, or an electronic memory terminal device like a random access memory (RAM), read only memory (ROM), flash memory devices, CD-ROM, DVD, Blue-ray disc and the like. The machine-readable transmission media may also be called a carrier, and may include, for example, electrical, optical, radio, acoustical or other form of propagated signals—such as carrier waves, infrared signals, and the like.

The techniques described herein may be implemented by various means so that an apparatus implementing one or more functions of a corresponding apparatus described with an embodiment includes not only prior art means, but also means for implementing the one or more functions of the corresponding apparatus described with the embodiment and it may include separate means for each separate function, or means that may be configured to perform two or more functions. For example, these techniques may be implemented in hardware (one or more apparatuses), firmware (one or more apparatuses), software (one or more modules), or combinations thereof. For a firmware or software, implementation may be made through modules (for example, procedures, functions, and so on) that perform the functions described herein.

Example embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including hardware, software, firmware, and a combination thereof. For example, in one embodiment, each block of the block diagrams and flowchart illustrations, and combinations of blocks in the block diagrams and flowchart illustrations can be implemented by computer program or computer program product which includes computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method in a network device operating in Long Term Evolution (LTE), the method comprising:
    receiving configuration information for a plurality of cells operating in New Radio (NR), the configuration information including NR system information; and
    broadcasting, to a terminal device operating in LTE, the configuration information for operating in NR by:
        broadcasting the configuration information for the plurality of cells in a single system information block (SIB); or
        broadcasting the configuration information for a first cell of the plurality of cells in a first SIB and broadcasting the configuration information for a second cell of the plurality of cells in a second SIB.

2. The method according to claim 1, further comprising broadcasting further information about the configuration information, wherein the further information is encoded for LTE.

3. The method according to claim 1, wherein the broadcasting the configuration information comprises:
    broadcasting the configuration information for the plurality of cells in a single container in the single SIB; or
    broadcasting the configuration information for each of the plurality of cells in a separate container in a respective separate SIB.

4. The method according to claim 1, further comprising:
    broadcasting further information about the configuration information to the terminal device, wherein the further information indicates one or more of:
        a type of the configuration information being broadcasted;
        an identifier for a SIB included in the configuration information being broadcasted;
        an identifier of a cell associated with the configuration information being broadcasted;
        an identifier of a new SIB of a cell used for carrying the configuration information;
        a parameter for broadcasting the configuration information; or
        any combination thereof.

5. A method in a terminal device served by a network device operating in Long Term Evolution (LTE), wherein the terminal device is capable of operating in LTE and in New Radio (NR), the method comprising:
    receiving, by the terminal device operating in LTE, configuration information broadcasted by the network device for a plurality of cells operating in NR, wherein the receiving the configuration information comprises:
        receiving the configuration information for the plurality of cells in a single system information block (SIB); or
        receiving the configuration information for a first cell of the plurality of cells in a first SIB and receiving the configuration information for a second cell of the plurality of cells in a second SIB; and
    accessing to operate in NR based on the received configuration information.

6. The method according to claim 5, further comprising receiving further information about the configuration information, wherein the further information is encoded in LTE.

7. The method according to claim 5, wherein the receiving the configuration information comprises:
    receiving the configuration information for the plurality of cells in a single container in the single SIB; or
    receiving the configuration information for each of the plurality of cells in a separate container in a respective separate SIB.

8. The method according to claim 5, further comprising:
    receiving further information about the configuration information from the network device, wherein the further information indicates:
        a type of the configuration information being broadcasted;
        an identifier for a SIB included in the configuration information being broadcasted;
        an identifier of a cell associated with the configuration information being broadcasted;
        an identifier of a new SIB of a cell used for carrying the configuration information;
        a parameter for broadcasting the configuration information; or
        any combination thereof.

9. A terminal device for service by a network device operating in Long Term Evolution (LTE), wherein the terminal device is capable of operating in LTE and in New Radio (NR), the terminal device comprising:
    a processor; and
    a memory containing instructions which, when executed by the processor, cause the terminal device to:
        receive, while operating in LTE, configuration information broadcasted by the network device for a plurality of cells operating in NR, wherein to receive the configuration information comprises:
            receive the configuration information for the plurality of cells in a single system information block (SIB); or
            receive the configuration information for a first cell of the plurality of cells in a first SIB and receive the configuration information for a second cell of the plurality of cells in a second SIB; and
        access to operate in NR based on the received configuration information.

10. The terminal device according to claim 9, wherein the terminal device is further to receive further information about the configuration information, wherein the further information is encoded for LTE.

11. The terminal device according to claim 9, wherein the terminal device is further to:
    receive the configuration information for the plurality of cells in a single container in the single SIB; or receive the configuration information for each of the plurality of cells in a separate container in a respective separate SIB.

\* \* \* \* \*